Patented Mar. 25, 1947

2,417,989

UNITED STATES PATENT OFFICE 2,417,989

MANUFACTURE OF SULFENAMIDES

Ralph G. D. Moore, Dedham, and Janet K. Sanford, Wellesley, Mass., assignors to United States Rubber Company, New York, N. Y., a corporation of New Jersey No Drawing. Application April 1, 1944, Serial No. 529,168

8 Claims. (Cl. 260—306.6)

This invention relates to the manufacture of N-substituted 2-benzothiazyl sulfenamides.

An object of the invention is to prepare sulfenamides by an economical process which will allow consistently high yields of the desired sulfenamides, even where amines are employed which do not lend themselves so easily to such results, by prior art methods, for example, isopropylamine oxidatively condensed with mercapto benzo thiazole or its alkali metal salts. Other objects will be apparent from the following description.

According to the invention, any amine having at least one replaceable hydrogen atom (primary or secondary) and which is stronger than ammonia (this excludes wholly aromatic amines such as aniline), may be used for the process. Any organic mercaptan or mercaptide which lends itself to oxidative condensation with such amines to form sulfenamides having the group TH—SN< (TH represents the thiazole nucleus), may be used, and particularly the alkali metal salts of mercapto benzo thiazole. Also, any of the known oxidizing agents usable for the preparation of sulfenamides may be used.

By an amine stronger than ammonia is meant an amine having at least one hydrogen atom attached to an amine nitrogen atom, whose dissociation constant is greater than $1.8 \times 10^{-5}$ at 25° C., and particularly the primary and secondary aliphatic amines, whether or not the aliphatic group is of the open-chain (acyclic) or closed-chain (alicyclic) series such as the cyclo-paraffins sometimes called the polymethylenes. The hydrocarbon groups may be saturated or unsaturated, and be substituted by non-hydrocarbon radicals such as chlorine, amino, hydroxy, etc. They may also be joined in ring formation with the amine nitrogen atom as in piperazine, morpholine, hexamethylene imine, etc.

We have discovered that consistently high yields of sulfenamides may be produced when an aqueous solution of the oxidizing agent and an aqueous solution of the aryl thiazole, in the form of a water-soluble alkali metal mercaptide, are separately and concurrently added to an aqueous solution of the amine or amine salt, meantime stirring the amine solution. The process may be carried out under various temperature conditions, but is best carried out under cooling conditions, e. g., preferably at a temperature between 0° C. and 50° C., although temperatures as high as 65° C. may be used.

By "concurrently" we mean that the two reagents which are added to the amine solution are for the most part substantially simultaneously added to the said amine solution, as exemplified in the illustrative examples below.

Exemplary of usable mercaptans are the following:

Mercapto benzo thiazole
2-mercapto benzo thiazole
2-mercapto-6-chloro-benzo thiazole
2-mercapto-6-phenyl-benzo thiazole Exemplary of usable primary amines are the following: methylamine, ethylamine, n-propylamine, isopropylamine, n-butylamine, isobutylamine, amylamines, allylamine, methallylamine, cyclohexylamine, benzylamine.

Exemplary of usable secondary amines are the following: dimethylamine, diethylamine, dipropylamine, diallylamine, morpholine, piperidine.

Oxidizing agents that may be used include the following: sodium hypochlorite, and hydrogen peroxide.

Suitable acidic materials for forming the amine salts are sulfuric acid, sodium acid sulfate, acetic acid, phosphoric acid, hydrochloric acid, etc.

The time of addition of the two reagents to the amine solution is variable, but for high productivity the rates of additions should be as rapid as possible. It has also been found advantageous to use a 10–20% excess (over the theoretical amount) of the oxidizing agent, the amine, and the acidic material, based on the amount of the mercaptan used, according to the equation

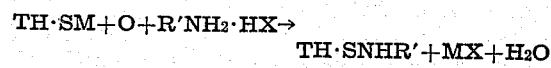

$$TH \cdot SM + O + R'NH_2 \cdot HX \rightarrow TH \cdot SNHR' + MX + H_2O$$

where R' is an aliphatic radical; M is a metal; and X is an acid radical.

In general, concentrations of the reagents should be as high as possible both to obtain maximum conversion of mercapto benzo thiazole to the desired sulfenamide and to permit the highest productivity for a given plant unit.

When all reactants have been added the mixture is preferably stirred for an hour before isolating the sulfenamide. The product is then separated, thoroughly washed with water, and dried at a temperature not exceeding about 50° C.

The following examples are illustrative of the invention, but are not to be construed as limiting thereto:

Example 1

A solution which is partially isopropylamine hydrochloride and partially isopropylamine (thereby having excess amine as described), was prepared by adding 2216 grams of isopropylamine (37.5 moles) slowly to a well-stirred mixture of 2265 grams of ice and 2265 ml. of concentrated hydrochloric acid (27.5 moles). After cooling this solution to 5° C., 15,050 ml. of 1.83 M sodium hypochlorite solution (27.5 moles) and 4175 grams of 2-mercapto-benzo thiazole (25.0 moles) dissolved in 1380 ml. of 18.12 N sodium hydroxide (25.0 moles) and 3000 ml. of ice water were added. These additions were carried out concurrently as follows: namely, by first adding 10% excess of sodium hypochlorite solution (1360 ml. or about 1/11 of the total volume) and then the rest of the hypochlorite and the sodium mercapto benzo thiazole solutions simultaneously and at equivalent rates. By adjusting the rates of addition and external cooling the temperature was kept between 20 and 30° C. After one hour of stirring at room temperature, the product was filtered, washed, and dried in a ventilated oven at 50° C. The yield of crude material assaying 92.2% sulfenamide was 4806 grams or 79.1% of the theoretical yield based on mercapto benzo thiazole.

The method of assay used for sulfenamides was based on a determination of the amount of combined amine. The determination was carried out by digesting for one hour a 1.0 gram sample in a Kjeldahl distillation flask with 40 ml. of 6 N hydrochloric acid containing 1 gram of stannous chloride dihydrate. To prevent undue evaporation of acid, a small funnel was inserted in the neck of the flask. To the digested sample after cooling 200 ml. of water, 50 ml. of 35% sodium hydroxide, and a little granulated zinc were added. The liberated amine was then distilled through a trap into 50 ml. of 0.1 N hydrochloric acid and the amount of amine was determined in the usual way by back titration with a decinormal sodium hydroxide solution.

Example 2

A solution containing cyclohexylamine hydrochloride and cyclohexylamine was prepared from 29.7 grams of cyclohexylamine (0.30 mole) and 42.8 ml. of 6.4 N hydrochloric acid (0.275 mole). To this was added with rapid stirring 159 ml. of 1.73 M sodium hypochlorite solution (0.275 mole) and 79.3 ml. of a solution containing the sodium salt of 41.75 grams of 2-mercapto benzo thiazole (0.25 mole). After an initial addition of 19 ml. of the hypochlorite the two solutions were added simultaneously and at equivalent rates. The temperature during reaction was kept below 30° C. After one hour of stirring the gray-green precipitate which formed was filtered off, washed to neutrality, and vacuum dried. There was obtained 48.5 grams of crude product assaying 92% sulfenamide.

Example 3

A solution containing diethylamine hydrochloride and diethylamine was prepared from 21.9 grams of diethylamine (0.30 mole) and 42.8 ml. of 6.4 N hydrochloric acid (0.275 mole). To this was added with rapid stirring 154 ml. of 1.79 M sodium hypochlorite (0.275 mole) and 79.3 ml. of a solution containing the sodium salt of 41.75 grams of 2-mercapto benzo thiazole (0.25 mole). After preliminary addition of 14.0 ml. of hypochlorite the additions of sodium hypochlorite and sodium mercapto benzo thiazole were carried out simultaneously. The temperature was kept at about 30° C. during the additions and allowed to come to room temperature during the subsequent hour of stirring. The product, separating as a brown oil, was taken up in petroleum ether, filtered to remove a small amount of insoluble by-product, washed to neutrality, and dried over anhydrous sodium sulfate. After removal of the solvent under reduced pressure, 46.4 grams of reddish brown oil assaying 95% sulfenamide was obtained.

Example 4

A mixture of the hydrochloride of piperidine and piperidine was prepared from 25.5 grams of piperidine (0.30 mole) and 42.8 ml. of 6.N hydrochloric acid (0.275 mole). After a preliminary addition of 14.0 ml. of 1.79 M sodium hypochlorite solution, 140 ml. of hypochlorite solution (total 0.275 mole) and 79.3 ml. of a solution containing the sodium salt of 41.75 grams of 2-mercapto benzo thiazole (0.25 mole) were added simultaneously and at equivalent rates. The temperature during the addition was kept between 16 and 33° C. A brown oily layer containing some solid formed. After one hour of stirring at room temperature the oily layer was combined with petroleum ether extracts of the aqueous layer, filtered, washed to neutrality, and dried over anhydrous sodium sulfate. After removal of the solvent by evaporation, 59.9 grams of crystalline product assaying 99% N-piperidinyl-2-benzothiazole-sulfenamide was obtained.

Example 5

To a solution containing 18.7 grams of monomethylamine hydrochloride (0.275 mole), 14.8 grams of monomethylamine (0.475 mole), and 79 ml. of water, there was added simultaneously 96.0 ml. of 2.87 M sodium hypochlorite solution (0.275 mole) and 82.2 ml. of a solution containing the sodium salt of 41.75 grams of 2-mercapto benzo thiazole (0.25 mole). The temperature was kept at 18 to 22° C. during the addition and the subsequent hour of stirring. The dark oil which separated was combined with three ether extracts of the aqueous layer, washed to neutrality, and dried successively over anhydrous sodium sulfate and calcium chloride. After removal of the ether under reduced pressure, 47.1 grams of dark greenish oil assaying 94% sulfenamide was obtained.

Example 6

To 135.6 ml. of a 4.05 N solution of isopropylamine hydrochloride (0.55 mole), 11.9 grams of isopropylamine (0.2 mole) was added. To this with rapid stirring 14.5 ml. or 10% of a solution containing the sodium salt prepared from 80.4 grams of 2-mercapto benzo thiazole (0.48 mole) in 145 ml. of solution was added, and immediately thereafter the remainder of the solution and 355 ml. of 1.55 M sodium hypochlorite solution (0.55 mole) were added simultaneously. The temperature was kept between 12 to 26° C. A yield of 86.8 grams of material assaying 91.4% sulfenamide was obtained.

Modification may be resorted to and chemical equivalents may be employed without departing from the spirit of the invention or the scope of the appended claims.

Having thus described our invention, what we claim and desire to protect by Letters Patent is:

1. A process which comprises substantially simultaneously and separately adding an aqueous solution of a 2-mercapto aryl thiazole and an aqueous solution of an oxidizing agent, to an amine solution whose amine has at least one replaceable hydrogen atom and is stronger than ammonia whereby to oxidatively condense the amine with the mercaptan in solution, to form relatively high yields of a sulfenamide.

2. A process of producing an N-substituted aryl thiazyl sulfenamide by oxidative condensation between a water-soluble mercaptide of a 2-aryl thiazole, and an amine having at least one replaceable hydrogen atom, and being stronger than ammonia, which comprises substantially simultaneously and separately adding an aqueous solution of the mercaptide, and an aqueous solution of an oxidizing agent, to an aqueous solution comprising a salt of the amine, and subsequently recovering the desired sulfenamide.

3. A process of producing an N-substituted benzo thiazyl sulfenamide by oxidative condensation between a water-soluble alkali metal salt of a mercapto benzo thiazole, and an amine having at least one replaceable hydrogen atom and being stronger than ammonia, which comprises substantially simultaneously and separately adding an aqueous solution of the said alkali metal salt, and an aqueous solution of an oxidizing agent, to an aqueous solution comprising a salt of the amine, and subsequently recovering the desired sulfenamide.

4. A process of producing an N-substituted benzo thiazyl sulfenamide by oxidative condensation between a water-soluble alkali metal salt of a mercapto benzo thiazole, and an amine having at least one replaceable hydrogen atom and being stronger than ammonia, which comprises substantially simultaneously and separately adding an aqueous solution of the said alkali metal salt, and an aqueous solution of an oxidizing agent, to an aqueous solution comprising the amine and a salt of the amine, and subsequently recovering the desired sulfenamide.

5. A process of producing an N-substituted benzo thiazyl sulfenamide by oxidative condensation between a water-soluble alkali metal salt of mercapto benzo thiazole, and an amine having at least one replaceable hydrogen atom and being stronger than ammonia, which comprises substantially simultaneously and separately adding an aqueous solution of the said alkali metal salt, and an aqueous solution of the sodium hypochlorite, to an aqueous solution comprising a salt of the amine, and subsequently recovering the desired sulfenamide.

6. A process of producing an N-isopropyl benzo thiazyl sulfenamide which comprises substantially simultaneously and separately adding a solution of an alkali-metal salt of mercapto benzo thiazole, and an aqueous solution of an oxidizing agent, to an aqueous solution comprising isopropylamine and a salt of isopropylamine, whereby to oxidatively condense the isopropylamine with the thiazole in solution, to form relatively high yields of the N-isopropyl benzo thiazyl sulfenamide.

7. A process of producing an N-substituted benzo thiazyl sulfenamide by oxidative condensation between a water-soluble alkali metal salt of mercapto benzo thiazole, and isopropylamine, which comprises substantially simultaneously and separately adding an aqueous solution of the said alkali metal salt, and an aqueous solution of sodium hypochlorite, to an aqueous solution comprising a salt of the amine, and subsequently recovering the desired sulfenamide.

8. A method of oxidatively condensing a mercapto benzo thiazole to a sulfenamide which comprises substantially simultaneously and separately adding the mercapto benzo thiazole in the form of an aqueous solution of alkali metal salt thereof, and an aqueous solution of an oxidizing agent, to an aqueous solution comprising an amine and a salt of the amine, said amine having at least one replaceable hydrogen atom and being stronger than ammonia.

RALPH G. D. MOORE.
JANET K. SANFORD.

REFERENCES CITED

The following references are of record in the file of this patent:

UNITED STATES PATENTS

| Number | Name | Date |
|---|---|---|
| 2,045,888 | Tschunkur et al. | June 30, 1936 |
| 2,268,467 | Ashworth | Dec. 30, 1941 |
| 2,191,657 | Harmon | Feb. 27, 1940 |
| 2,271,834 | Carr | Feb. 3, 1942 |
| 2,354,427 | Carr | July 25, 1944 |